United States Patent Office 3,544,646
Patented Dec. 1, 1970

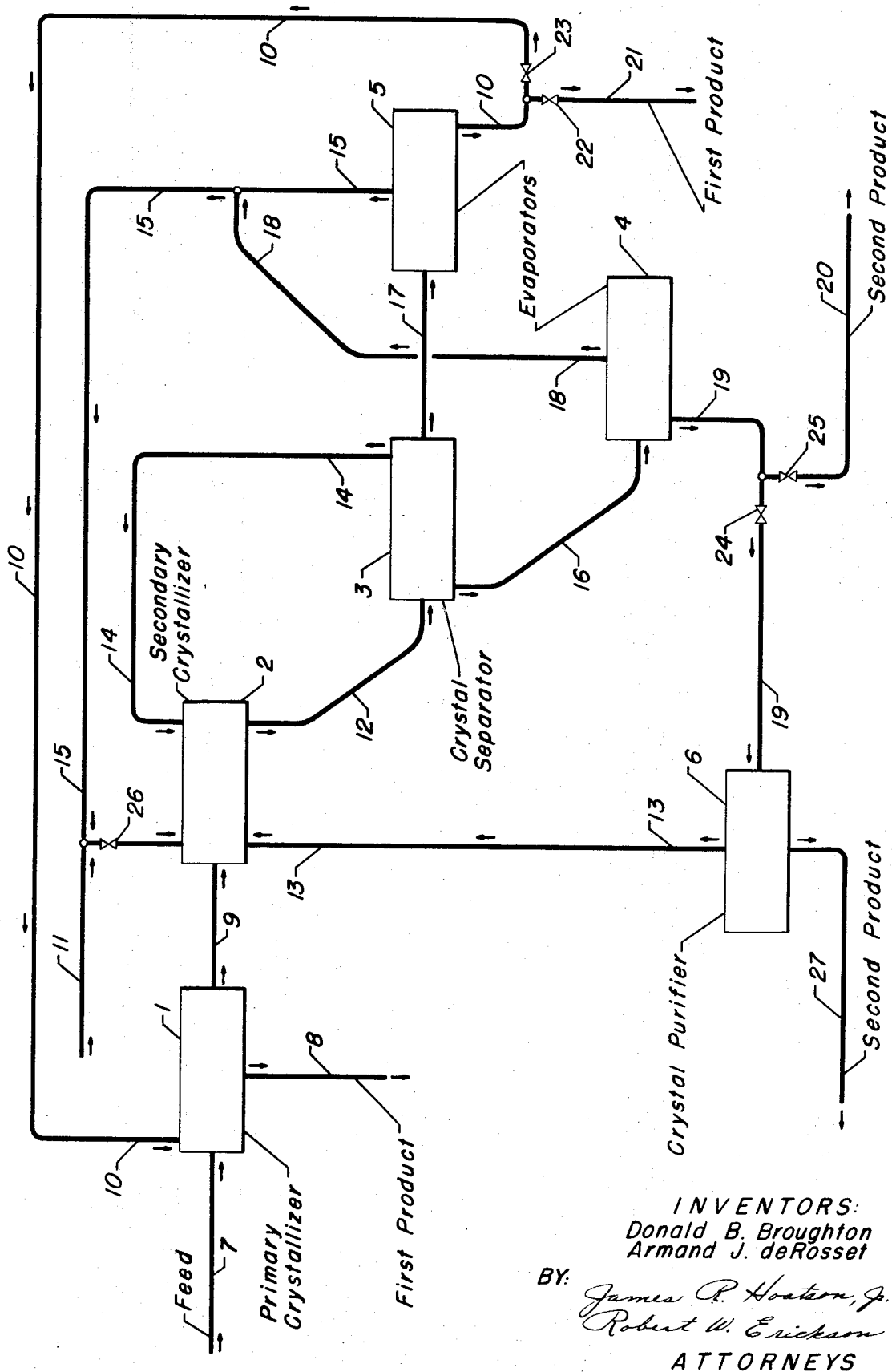

3,544,646
HYDROCARBON SEPARATION VIA
CRYSTALLIZATION METHODS
Donald B. Broughton, Evanston, and Armand J. de Rosset, Clarendon Hills, Ill., assignors to Universal Oil Products Company, Des Plaines, Ill., a corporation of Delaware
Filed Oct. 9, 1968, Ser. No. 766,115
Int. Cl. C07c 7/14
U.S. Cl. 260—674                                    9 Claims

ABSTRACT OF THE DISCLOSURE

A process for the separation of components of a feed mixture which components form crystals having sufficient crystal density differences to allow a physical separation of the crystals. The feed mixture passes into a primary crystallization zone wherein a pure component of the feed is crystallized and recovered. The remaining mother liquor is contacted with a miscible liquid diluent in a second crystallization zone. The resulting diluted mother liquor mixture is controlled at a temperature to allow crystallization of at least two components of the feed and the crystals are separated into individual concentrated streams which are collected as desired products.

BACKGROUND OF THE INVENTION

This invention relates to the general field of hydrocarbon separation and more particularly to separation involving crystallization of feed components and the subsequent physical separation of the crystals. A part of the feed mixture is crystallized in a first crystallization zone and the remaining mother liquor then mixed with a miscible diluent in a second crystallization zone at a temperature conducive to crystallization of at least two of the feed components, the crystals formed are then separated from the mixture of diluent and mother liquor to give separate concentrated crystalline components of the feed.

The multitude of prior art involving hydrocarbon separation by crystallization pertains to crystallization of single components from a feed mixture containing several components. In crystallization processes where crystallization of one of the feed mixture components reduces the feed composition in the crystallized component and where the resulting feed mixture composition eventually reaches a eutectic composition, it can be seen that it is impossible to obtain complete recovery of individual pure components of the feed mixture by single component crystallization. As part of the process of this invention a feed mixture is crystallized while intimately in contact with a miscible liquid diluent thereby yielding at least two separate crystalline components which are separated to give individual concentrated products. The process of the present invention allows complete separation of a feed mixture which is not possible using the single component crystallization methods of prior art processes.

SUMMARY

Objects of the process of this invention are listed as follows:

(1) It is an object of this invention to separate crystallized components of a feed mixture which have differing crystal densities.

(2) It is an object of this invention to crystallize at least two components of a feed mixture using a liquid diluent which is miscible with the feed mixture.

(3) It is an object of this invention to separate the components of a eutectic feed mixture by simultaneously crystallizing two or more crystals of a eutectic feed mixture in admixture with a liquid diluent and physically separating the individual crystallized components to give concentrated products.

(4) It is an object of this invention to separate meta-xylene from a feed mixture comprising para-xylene and meta-xylene by mixing a eutectic feed mixture with a miscible liquid diluent at a temperature below the eutectic temperature of the feed mixture and controlling the amount of liquid diluent addition to maintain the density of the coolant feed mixture at a value between the density of the meta-xylene and para-xylene crystals to effect the separation of the para-xylene and meta-xylene crystals into concentrated product streams.

These and other objects of this invention will become apparent in light of further disclosure of the invention. As previously mentioned, single component crystallization in systems where eutectic mixtures are formed do not allow complete recovery of pure components from the feed mixture because of the simultaneous crystallization of one or more feed components when the eutectic temperature is reached. The process of this invention in using a miscible liquid diluent which both aids in crystallization of feed components and in their separation into concentrated product streams overcomes the limitations of incomplete recovery which are present in the prior art single component crystallization processes.

DESCRIPTION OF THE DRAWING AND DETAILED SUMMARY OF THE PROCESS FLOW

Referring to the attached drawing, the process flow for the present invention is presented. A feed mixture passes through line 7 into the primary crystallizer 1 wherein a single component of the feed is crystallized. The crystallized component of the feed mixture is separated from the remaining feed mixture or mother liquor and passes through line 8 to be collected as product. The crystals can be separated from the remaining mother liquor by known methods which include filtration and centrifugal separation operations and collected as a first crystalline product from line 8. Line 10 when used in the process carries crystals from evaporator 5 to the primary crystallizer as a recycle steam for further purification of the recycled crystals when needed. The crystals that pass through line 10 as a recycle stream are essentially the same as the component crystallized from the feed in the primary crystallizer. The recycle stream flowing through line 10 is used when the purity of the crystalline material leaving evaporator 5 is below acceptable standards. The crystalline material leaving evaporator 5 is in some cases contaminated with material which is fed to the other evaporator. Generally where the separation taking place in crystal separator 3 is not quite complete there is contamination of the crystalline products leaving one of the evaporators by crystalline products of the same type that leave the other evaporator.

The crystalline impurities present in the crystal product passing through line 10 are melted in the primary crystallizer and become part of the mother liquor which then passes through line 9 to be the secondary crystallizer. A major portion of the crystalline product which is recycled through line 10 to the primary crystallizer is recovered as a first crystalline product from line 8. The mother liquor from the primary crystallizer then is passed through line 9 to the secondary crystallizer 2. The one component crystallized from the feed mixture in the primary crystallizer alters the remaining mother liquor composition so that the eutectic composition of the resulting mixture is approached. In the secondary crystallizer the mother liquor from the primary crystallizer flowing through line 9 is admixed with liquid diluent flowing through line 15. The miscible liquid diluent flowing through line 15 in addition to cooling the mother liquor passing through line 9 also dilutes the mother liquor. The liquid diluent flowing through line 15 is regulated by valve 26 to maintain the density of the diluted mother liquor in the secondary crystallizer between the value of the density of at least two of the crystal components formed in the secondary crystallizer at the eutectic temperature of the diluted mother liquor. The slurry of diluted mother liquor and the crystals formed in the secondary crystallizer is passed through line 12 into crystal separator 3 which effects the separation of streams comprising: (a) the crystals having a density less than the diluted mother liquor, (b) the crystals having densities greater than the diluted mother liquor and, (c) the diluted mother liquor. Crystal separator 3 can effect the aforementioned separation by flotation or by centrifugal separation methods. When flotation methods are used, the diluted mother liquor density being less than the density of some of the crystals and greater than the density of some of the other crystals effects the concentration of the less dense crystals towards the upper portions of the diluted mother liquor in the crystal separator and the more dense crystals towards the lower portions of the diluted mother liquor in the crystal separator. Draw-off lines at the top and bottom of the crystal separator remove streams containing diluted mother liquor and concentrated quantities of crystals. The crystals are separated from the diluted mother liquor by well known methods including filtration or centrifugal separation and pass through lines 16 and 17 to evaporators 4 and 5 respectively. The diluted mother liquor separated from the crystals is recycled through line 14 to the eutectic crystallizer. When centrifugal methods of separation are employed in the crystal separator the more dense crystals can be concentrated in an outer zone of a centrifuge basket or drum and the less dense crystals together with diluted mother liquor can be removed for further separation by another centrifugal operation or by filtration or by combinations of both. The diluted mother liquor is returned to the secondary crystallizer as when flotation methods of separation as previously described are used.

Evaporators 4 and 5 operate in similar manners in that any diluent entrained with the crystals passed to the evaporators is flashed off from the crystals. The evaporators are either operated at a reduced pressure or at an elevated temperature to allow the lower boiling diluent remaining with the crystals to be removed from the crystals. The diluent flashed off from the evaporators is recycled back to the secondary crystallizer through lines 15 and 18. Make-up diluent when needed may be added through line 11.

The relatively pure separated crystal products can be withdrawn from the evaporators 4 and 5 through lines 19 and 20, and lines 10 and 21 respectively. When this type of flow scheme is used valve 24 in line 19 is closed and valve 25 in line 20 is opened to allow the crystal material leaving evaporator 4 to be collected as product. In a similar manner valve 23 in line 10 is closed and valve 22 in line 21 is opened so as to allow the separated crystals from evaporator 5 to be collected directly as product.

In some instances where high purity crystalline products are required or where there is not an efficient separation of crystals from entrained liquid from the evaporators or from the crystal separator, a part of or all of the crystals leaving the evaporators may be further purified by passage to further purification zones. The crystal separator is operated so that the same type of crystalline product that is recovered in the primary crystallizer and which is also crystallized and separated in the crystal separator flows through line 17 to evaporator 5. This allows the crystals removed from evaporator 5 via line 10 to be partially recycled to the primary crystallizer through line 10 when valve 23 is opened. Since the feed passing into the primary crystallizer through line 7 contains a quantity of a particular feed component present in excess over the quantity of that component present at the feed mixture eutectic composition recycling a stream containing substantial quantities of that component to the primary crystalizer allows a purification of the recycle stream where other crystal types are contaminating the recycle stream. The purification is accomplished in the primary crystallizer by remelting the undesired crystals present in the crystal stream leaving evaporator 5 through lines 10 and 21. Substantially all of the desired crystals that are recycled through line 10 are recovered from the primary cystallizer through line 8.

The crystals leaving evaporator 4 through lines 19 and 25 are primarily the crystals formed in the secondary crystallizer which are not crystallized in the primary crystallize. When the crystalline product stream passing through line 25 is of insufficient purity, crystal purifier 6 can be used to treat a portion or all of the crystal material leaving the evaporator 4. Valve 24 can be opened to allow the impure crystal stream to flow into crystal purifier 6 where purification can take place. Crystal purifier 6 can effect the purification of the stream fed to it through line 19 by remelting and recrystallization steps. The recrystallized purified product leaves the crystal purifier through line 27 and a mixture containing the impurities present in the material flowing through line 19 into the crystal purifier is recycled to the secondary crystallizer through line 13. The impurities present in the feed passing through line 19 to crystal purifier 6 are generally entrained portions of the feed mixture originally entering the process through line 7 and which are carried through the process contaminating the product crystals removed from evaporator 4 via line 19. In some cases the crystals leaving evaporator 4 via line 19 to crystal purifier 6 are collected as product material from line 25.

A preferred, but not necessarily limiting, feed stock which can be used in the process of this invention is a mixture of para and meta-xylene. Para and meta-xylene isomers boil at temperatures that for all practical purposes are the same (para-xylene B.P., 138.5° C. and metal-xylene B.P., 138.8° C.) and consequently provide an extremely difficult if not impossible system to be separated by presently known commercial fractionation methods. There is sufficient difference in the meta and para-xylene freezing points to effect the separation of these two isomers by crystallization methods (para-xylene F.P., 13.2° C. and meta-xylene F.P., −47.4° C.).

When a feed mixture of para-xylene and meta-xylene is fed to the process of this invention the type of crystals first formed in the primary crystallizer is dependent upon the composition of the feed mixture. The approximate eutectic composition of a para-xylene and meta-xylene mixture is about 12 wt. percent para-xylene and 88 wt. percent meta-xylene. It can be seen that if a metal-xylene and para-xylene feed mixture containing a larger percentage of para-xylene thanthe percentage at the mixture's eutectic is fed to the primary crystallizer through line 7 that a single para-xylene crystal material will be formed and can be withdrawn via line 8. In a similar manner where the feed mixture is rich in meta-xylene (greater than the 88 wt. percent eutectic composition) and single meta-xylene crystal material will be formed in the primary crystallizer and the remaining mother liquor which has a composition close to the feed eutectic composition will feed to the eutectic crystallizer via line 9. The primary crystallizer temperature is controlled to prevent the feed mixture from reaching the eutectic temperature which allows the simultaneous formation of two or more crystals depending on the feed mixture composition. Preferably the primary crystallizer allows the feed mixture to be cooled to a temperature just above the eutectic temperature of the feed mixture so as to allow a maximum recovery of a single component from the feed to the primary crystallizer.

The secondary crystallizer is preferably operated at a temperature of less than the operational temperature of the primary crystallizer to allow the eutectic mixture to form the individual crystals and to account for the freezing point depression of the eutectic mixture because of its dilution with the miscible liquid diluent. The secondary crystallizer preferably has a large liquid to solid crystal ratio which is constantly mixed to prevent agglomerization of large crystal particles containing different crystalline components of the feed. The secondary crystallizer can be cooled by external refrigeration methods or by precooling the mother liquor feed and/or liquid diluent or by using combinations thereof. A limitation when using precooled liquid diluent is that the quantity of liquid diluent used must allow the diluted mother liquor mixture density to be maintained at a value between the densities of at least two of the crystals formed in the secondary crystallizer to facilitate separation of the crystalline materials in the crystal separator as previously mentioned while maintaining a required temperature in the secondary crystallizer.

The liquid diluent used in the process of this invention must meet the following requirements: (1) the diluent must boil below the boiling point of the crystallizeable components of the feed; (2) the diluent must be physically compatable with the feed mixture so that when the feed and coolant are mixed, the resultant diluted mother liquor remains in a single phase; (3) the diluent must freeze below the eutectic point temperature of the feed; and, (4) the liquid diluent must have a density greater than the density of the liquid feed at the eutectic temperature of the feed. Examples of possible diluents which can be used in the process of the invention when most hydrocarbon feeds are used are the halogenated hydrocarbons including Freon 21 and 12, bromine substituted ethanes, etc. The following table summarizes some of the physical properties of the diluents which can be used and indicates the percent of diluent that is present in the diluted mother liquor in the crystal separator to maintain the diluted mother liquor at a density between para-xylene and meta-xylene crystals for a para-xylene and meta-xylene feed system:

| Coolant, type | Density, g./cc. | Freezing point, °C. | Boiling, poit, °C. | Percent coolant in diluted mother liquor to maintain density at 1.018 [1] |
|---|---|---|---|---|
| Freon 12 | [2] 1.514 | −155 | −30 | 16 |
| Freon 21 | 1.517 | −135 | +9 | 16 |
| CH₃CHBr₂ | [3] 2.005 | −63 | +110 | 7 |

[1] Since in the separation of meta-xylene and para-xylene, the diluted mother liquor density in the secondary crystallizer is controlled at a value between the densities of the para-xylene and meta-xylene crystals, the value of 1.018 g./cc. for the density of the diluted mother liquor was chosen. The para-xylene solid crystal density is 1.006 g./cc. and meta-xylene solid crystal density is 1.030 g./cc.
[2] At −40° C.
[3] At −20° C.

When a para-xylene and meta-xylene feed mixture is fed to the process of this invention, the primary crystallizer is maintained at a temperature above about −53° C., which is the eutectic temperature of a binary system containing para and meta-xylene. It is preferable to operate the primary crystallizer at a temperature near the eutectic temperature of the feed mixture so that a maximum amount of the single component (para or meta-xylene) crystallized in the primary crystallizer can be recovered. The secondary crystallizer is maintained at a temperature below the eutectic temperature of the mother liquor fed to the secondary crystallizer from the primary crystallizer because of the slight reduction in freezing point associated with the dilution of the motor liquor with the liquid diluent passing into the secondary crystallizer. During normal operations of the secondary crystallizer, the temperature of the material therein is controlled to allow a portion of the para and meta-xylene components to crystallize while still leaving some diluted mother liquor (para-xylene, meta-xylene and liquid diluent) in the secondary crystallizer.

As previously mentioned, the diluted mother liquor density is maintained between the densities of at least two of the feed components crystallized in the secondary crystallizer and in order to maintain this relationship, it is preferable to keep the temperatures of the secondary crystallizer and the crystal separator substantially the same. A temperature difference between the secondary crystallizer and the crystal separator which causes either melting of para and meta-xylene crystals formed in the secondary crystallizer or crystallization of additional xylene crystals in the crystal separator alters the composition of the diluted mother liquor by increasing the percentage of diluent that is present in the diluted mother liquor. The increase or decrease in the percentage of diluent present in the diluted mother liquor alters the density of the diluted mother liquor which can affect the ability of the diluted mother liquor to separate the para and meta-xylene crystalline components present in the crystal separator.

In the case where a meta-xylene and para-xylene feed mixture is used, one of the evaporators is fed a stream comprising a major portion of meta-xylene crystals which contains some diluted mother liquor. Both crystalline streams that leave the evaporators are substantially free of liquid diluent which is flashed off or evaporated from the crystalline material entering the separate evaporators.

The crystal purifier is operated at a temperature to effect the melting of any other crystalline material that is contaminating the crystalline stream that is being fed to the crystal purifier.

DESCRIPTION OF PREFERRED EMBODIMENTS

A broad embodiment of the process of this invention resides in a process for the separation of feed components using a combination of crystallization zones which substantially completely recover relatively pure crystallized component of a feed. In another embodiment, the present invention relates to a crystallization process in which a feed mixture is passed into a primary crystallizer wherein a pure component is crystallized and recovered, the remaining mother liquor is then passed to a secondary crystallizer wherein the mother liquor is admixed with a liquid diluent, the resultant mixture is maintained at a temperature less than the eutectic temperature of the mother liquor fed to the secondary crystallizer to form crystalline components of the feed mixture having varying densities, the density of the mixture of diluent and mother liquor in the secondary crystallizer is maintained at a value between at least two of the crystalline components formed in the secondary crystallizer by controlled addition of diluent to the secondary crystallizer, at least a portion of the mixture of diluent and mother liquor and crystallized components formed in the secondary crystallizer is passed into a crystal separator wherein the crystalline components having different densities are separated into concentrated streams.

What is claimed:
1. A process for the separation of components of a liquid feed mixture which components form crystals of varying densities, which process comprises the steps of:
  (a) passing said liquid feed into a primary crystallization zone at conditions selected to effect the crystallization of a first crystalline product of the feed;
  (b) separating the crystalline product from the remaining mother liquor;
  (c) passing said mother liquor into a secondary crystallization zone wherein said mother liquor is admixed with a miscible liquid diluent;
  (d) maintaining the resultant diluted mother liquor within said secondary crystallization zone at a temperature less than the eutectic temperature of said mother liquor passed into said secondary crystallization zone to effect crystallization from said diluted mother liquor of components of varying densities, and maintaining said diluted mother liquor density at a value between the densities of at least two of the components crystallized in said second crystallization zone;

(e) passing a portion of said diluted mother liquor together with a portion of the crystallized components formed in the secondary crystallization zone to a crystal separation zone and separating and withdrawing therefrom streams comprising:
   (1) miscible liquid diluent and at least one crystalline component having a density greater than the density of said diluted mother liquor present in the crystal separation zone;
   (2) miscible liquid diluent and at least one crystalline component having a density less than the density of said diluted mother liquor present in the crystal separation zone; and
   (3) diluted mother liquor; and (f) recycling at least a portion of the diluted mother liquor withdrawn from said crystal separation zone to said secondary crystallization zone.

2. A process as in claim 1 further characterized in that said stream comprising miscible liquid diluent and at least one crystalline component having a density less than the density of said diluted mother liquor in the crystal separation zone is passed into a first evaporator at conditions to effect separation of diluent from the crystalline material passed into said evaporator.

3. A process as in claim 1 further characterized in that said stream comprising miscible liquid diluent and at least one crystalline component having a density greater than the density of said diluted mother liquor in the crystal separation zone is passed into a second evaporator at conditions to effect separation of diluent from the crystalline material passed into said evaporator.

4. A process as in claim 3 further characterized in that a separated crystalline material from one of said evaporators is passed to a crystal purification zone at conditions to effect the recovery of a second crystalline product of higher purity than the crystalline material fed to said crystal purification zone.

5. A process as in claim 4 further characterized in that a portion of a separated crystalline material from one of said evaporators is recycled to the primary crystallization zone at conditions to effect the additional recovery of a first crystalline product of higher purity than the crystalline material recycled to said primary crystallization zone.

6. A process as in claim 5 further characterized in that the miscible liquid diluent has a boiling temperature substantially lower than the boiling temperature of said liquid feed mixture.

7. A process as in claim 6 further characterized in that the feed mixture comprises meta and para-xylene.

8. A process as in claim 7 further characterized in that the feed mixture contains more than about 12 wt. percent para-xylene and that at least a portion of the para-xylene crystals from one of said evaporators are recycled to the primary crystallizer.

9. A process as in claim 8 further characterized in that the miscible liquid diluent has a density greater than the density of said mother liquid passed into the secondary crystallization zone.

References Cited

UNITED STATES PATENTS

| | | | |
|---|---|---|---|
| 2,428,102 | 9/1947 | Swietoslawski | 260—674 |
| 2,540,083 | 2/1951 | Arnold | 260—666 |
| 2,622,115 | 12/1952 | Carney | 260—674 |
| 2,835,714 | 5/1958 | Nixon et al. | 260—674 |
| 3,029,278 | 4/1962 | Spiller et al. | 260—707 |

DELBERT E. GANTZ, Primary Examiner

C. E. SPRESSER, Jr., Assistant Examiner

U.S. Cl. X.R.

62—58; 260—707